Feb. 18, 1941.   C. F. STRONG   2,232,495
POWER GENERATING SYSTEM WITH SYNCHRONIZING AND TIMING CONTROL
Filed Oct. 28, 1938
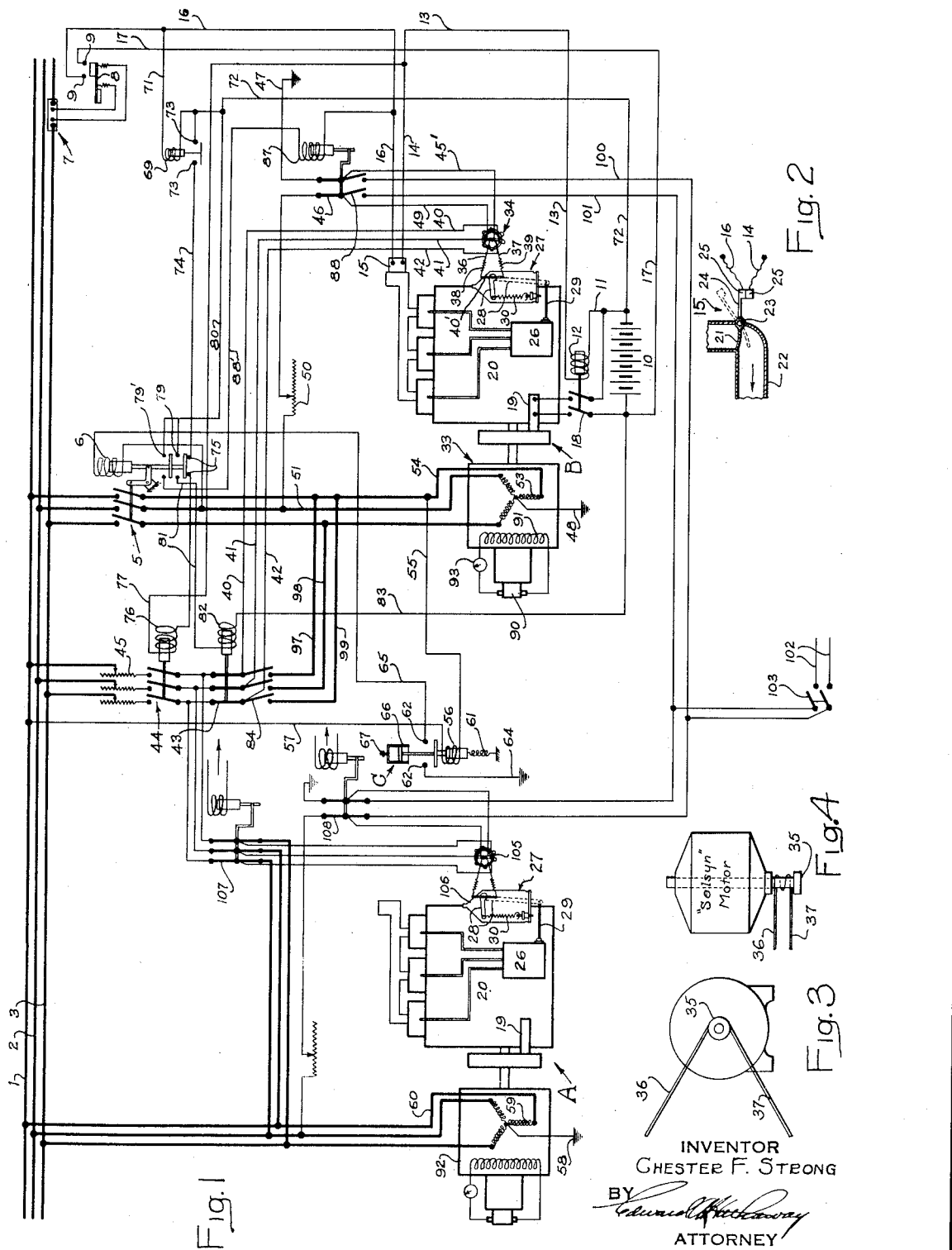
INVENTOR
CHESTER F. STRONG
BY
ATTORNEY Patented Feb. 18, 1941

2,232,495

UNITED STATES PATENT OFFICE 2,232,495

POWER GENERATING SYSTEM WITH SYNCHRONIZING AND TIMING CONTROL

Chester F. Strong, New York, N. Y.

Application October 28, 1938, Serial No. 237,495

8 Claims. (Cl. 290—4)

This invention relates generally to a power generating system employing a plurality of engine driven alternating current units which are automatically started in accordance with load demand and relates more particularly to an improved system and apparatus for synchronizing each unit with the main line current and also for controlling the units in a predetermined times relation to a standard source of alternating current.

Automatic engine driven generating systems of the type wherein generating units are started and brought on to the line in accordance with load demand, have heretofore presented a very serious and difficult problem where alternating current generating units are employed, especially when driven by Diesel engines. It is an object of my invention to provide in a plural unit alternating current system an improved synchronizing system and apparatus for controlling the engines, such as Diesel engines, with a sufficient degree of flexible and sensitive cooperation with the generating equipment whereby an incoming generator may be brought on to the main line with reasonable dispatch and certainty.

A further object is to provide an improved synchronizing system as aforesaid whereby the synchronizing apparatus is of a relatively simple and yet positive nature and thereby provide a synchronizing apparatus that is relatively inexpensive, compact and subject to low maintenance expense. In the specific aspect of this phase of the invention, I have provided an improved system which allows "Selsyn" type of motors to be used in association with the engine governors and so inter-related to each other and to the generator windings and main line as to permit very effective synchronizing control and operation.

A further object is to provide an improved system and apparatus whereby the generating units may be operated in a predetermined timed relation to a standard frequency. It is a further object in this respect to provide an improved automatic timing control that employs certain of the synchronizing elements such as the "Selsyn" motors thereby producing a relatively simple apparatus adapted to perform multiple functions such as allowing the equipment to be easily transferred from its synchronizing to its timing function or vice versa.

Other objects and advantages will be more apparent to those skilled in the art from the following description of the accompanying drawing in which:

Fig. 1 is a diagram of the synchronizing and timing system as related to the engine governors and engine driven generators;

Fig. 2 is an enlarged fragmentary section of a control valve to automatically control the circuit for the engine starting motor in accordance with the engine speed.

Fig. 3 is a side elevation and Fig. 4 is a plan view, of a "Selsyn" motor in diagrammatic form such as employed in my improved system.

In the particular embodiment of the invention I have shown two alternating current electric generating units generally indicated at A and B, the primary source of power in this case being an internal combustion engine, preferably of the Diesel type, although my invention is applicable to any source of governed power driving an alternating current electric generator. For convenience, the electrical generators shown are indicated with star windings, with neutral to ground. In the present disclosure it is assumed that generating unit A is in operation and is connected electrically to the main lines 1, 2 and 3. Generating unit B may be connected to lines 1, 2 and 3 through an automatically controlled switch 5 which is closed by energizing a solenoid 6 at the time when a relay C responds to unit B being either in exact synchronism or close to exact synchronism with the generator of unit A.

Generating unit B is started automatically upon occurrence of a predetermined line load supplied by generating unit A, a portion of the line load being diverted by a shunt 7 to a bimetallic heat responsive relay switch arm 8. This relay offers sufficient resistance to the passage of current around shunt 7 to cause it to close a pair of contacts 9 upon occurrence of a predetermined line load. Closure of contacts 9 establishes a circuit from a battery 10 through wire 11, solenoid 12 and wires 13 and 14, a suitable control switch 15 (to be described later) and thence through wire 16, contacts 9 and wire 17 to the other side of battery 10. Energization of solenoid 12 closes a switch 18 to connect battery 10 to a suitable electric starting motor diagrammatically indicated at 19. Thereupon the engine 20 of generating unit B is rotated until the engine starts and comes up to normal speed under its own power.

To break the circuit for starting motor 19 after the engine has reached a desired speed, the control switch 15 comprises, as shown in Fig. 2, a light weight flap or valve 21 disposed in the air intake manifold 22 of the engine, the valve 21 being pivoted as at 23 and having a contact arm 24 movable with the flap so as to open or close contacts 25 to which wires 14 and 16 are respectively connected. When the engine 20 is not running or is being turned over only slowly by starting motor 19, a very small amount of air flows through intake manifold 22 past suitable clearances around flap valve 21. This small flow of air is not sufficient to open contacts 25 and hence the starting circuit remains closed. However, when engine 20 speeds up, requiring a much larger supply of air to the cylinders through the intake manifold, valve 21 is swung into the dotted line position, as indicated, thereby breaking contacts 25 to open the starting circuit. Accordingly, solenoid 12 is deenergized and switch 18 opens. Inasmuch as the engine has started, it is receiving fuel from a suitable usual injection pump diagrammatically indicated at 26 in the case of a Diesel engine, or through a suitable carburetor device in the case of an internal combustion engine having spark ignition. In either case when the engine has started it then comes under the control of a suitable speed governor diagrammatically shown at 27. Inasmuch as various types of centrifugal flyball governors are well-known in the art, it will suffice to state the speed responsive movable element of the governor adjusts bell crank arm 28, the vertical arm of which is connected by a link 29 to control fuel pump 26 in any usual and well-known manner to maintain a predetermined speed. The speed is determined by suitable adjustment of the fixed end of a spring 30, the movable end thereof being connected to the horizontal bell crank arm to resist movement thereof.

When the engine is running at or near synchronous speed the following improved apparatus connects a generator 33 to the line. A usual and well-known form of "Selsyn" motor has a rotor pulley 35 around which a cable is spirally wrapped for a few turns, the two ends 36 and 37 of the cable being connected to springs 38 and 39 which, in turn, are connected to a common cross bar 40'. This cross bar is secured to the pivot shaft of bell crank 28 whereby rotation of the "Selsyn" rotor in a clockwise direction will increase the tension on cable spring 38 and decrease tension on cable spring 39 thereby adjusting the fuel pump link 29 to increase the power and speed of the engine, or vice versa, in the event of counterclockwise movement of the "Selsyn" rotor. By such operations the engine 20 can be adjusted to synchronous speed. To render "Selsyn" motor 34 responsive to the frequencies of generating units A and B, the "Selsyn" motor is provided with usual stator and rotor windings one of which is connected to generating unit A and the other of which is connected to generator 33 of unit B. The connection of one of these windings, specifically the stator winding, is through wires 40, 41 and 42, switch arms 43 in their closed position in a manner to be described shortly and through adjustable resistance 45 to the main line wires 1, 2 and 3. The rotor winding of "Selsyn" motor 34 is connected to one phase of generator 33 by a wire 45', a switch 46, a ground connection 47 and thence to a ground connection 48 of generator 33 of unit B and by another wire 49 to switch 46 and adjustable resistance 50 to a wire 51 leading to one phase winding of generator 33. If the speed of operation of generating unit B is above or below the main line frequency (speed of generating unit A), then the rotor and stator windings of "Selsyn" motor 34 will adjust the governor bell crank arm 28 to increase or decrease the amount of fuel supplied to engine 20 and accordingly vary its speed until it approaches main line frequency.

When the frequency of generating units A and B are in synchronism or substantially so, it is then desired to connect generating unit B to the line by closing switch 5. This is accomplished in the following manner: I connect phase coil 53 of generator 33 through wires 54 and 55 to a solenoid 56 of synchronous responsive relay C and thence through a wire 57 to main line 1. It will be noted that wire 54 of generator 33 will be also connected to line 1 upon subsequent closure of switch 5. If the generating units A and B have not as yet been brought into synchronism, then an interchange of current will take place through their respective ground connections 48 and 58 and thence through phase coil 59 of the generator of unit A, wire 60, main line wire 1, wire 57, solenoid 56, and wires 55 and 54 through phase coil 53 of the generating unit 33 of unit B and thence to ground 48. This interchange of current energizes solenoid 56 so as to hold the same down against a compression spring 61 thereby holding open a pair of contacts 62. When the two generators are exactly opposite in phase the current through solenoid 56 will be the sum of the two voltages of generator coils 53 and 59, and when the generators are in phase the voltages of the two coils 53 and 59 will be the same and hence no interchange of current will take place through synchronous responsive relay solenoid 56. Thereupon compression spring 61 can move the relay armature upwardly to close contacts 62 thereby to establish a circuit from the ground of one generator through a ground connection 64, wire 65, solenoid 6 and wire 51 to one phase winding of generator 33. Energization of solenoid 6 closes main generator switch 5 to connect generator 33 of unit B to the main line.

To prevent solenoid 56 from vibrating and momentarily closing contact 62 when generator 33 is close to synchronous speed but is still passing the position of synchronism too rapidly to satisfactorily permit closing of the main line switch 5, I have provided a dashpot 66 having a well-known adjustable vent 67 to control the degree of responsiveness of solenoid 5. When substantial synchronism has been reached and maintained for a given period of time, then contact 62 will close to connect generator 33 of unit B to the main line wires 1, 2 and 3.

It is desirable to automatically discontinue supply of current to the "Selsyn" motor 34 when generating unit B is connected to the main line. It will be first pointed out that the supply circuit for the "Selsyn" motor is controlled by a relay solenoid 69 which is energized, upon closure of load responsive contacts 9, by battery current through wires 17, 71 and 72. Solenoid 69 thereupon closes contacts 73 to supply current from one side of battery 10 through wire 72, across contact 73, wire 74, across normally closed contacts 75 to a switch solenoid 76 and thence through wires 77 and 13 to the other side of battery 10. Energization of solenoid 76 closes switch 44 thereby supplying current, in the manner previously described, from the generating unit A through main wires 1, 2 and 3, switch 44 and wires 40, 41 and 42 to "Selsyn" motor 34. However, then main line switch 5 of generating unit B is closed upon energization of solenoid coil 6 in the manner heretofore described, then contacts 75 are opened to break the circuit through wire 74 whereupon solenoid 76 is deenergized to open switch 44 and thereby break the supply circuit to "Selsyn" motor 34. Also upon opening of contacts 75, two pairs of contacts 79 and 79' are closed thereby establishing a circuit from one side of battery 10 through wires 72 and 80 contacts 79, wire 81, solenoid 82 and a wire 83 to the other side of the battery. Solenoid 82 is thereby energized to open switch 43 and close switch 84 for effecting an electrically controlled timing operation to maintain current at a predetermined cycle in a manner hereafter described. At this point it will be mentioned that a solenoid 87 is also energized for the subsequent timing operation thereby to open switch 46 and close a switch 88. The circuit for solenoid 87 is from battery 10 through wire 17, across closed contacts 9 and wire 16 to solenoid 87 and thence through wire 88', closed contacts 79', and wires 80 and 72 to the other side of battery 10. Opening of switch 46 discontinues supply of current to the "Selsyn" motor from generator 33 by way of wire 51.

It will be understood that as soon as generator unit 33 begins to pick up speed, its exciter 90 energizes a shunt field 91 and causes voltage to be generated approximately equal to the voltage of the generator 92 of unit A. The voltage of machine B may be determined by a usual adjustable field rheostat 93. It will be noted that switch 5 can not be closed unless generator B is approximately up to full voltage as coil 6 will not close switch 5 unless this condition exists.

Briefly, the synchronizing operation is as follows: Generating unit A continuously supplies current to the main line 1, 2 and 3. Upon a predetermined load demand thermostatic switch 8 energizes solenoid 12 to supply battery current to starting motor 19, unit B. When the unit reaches a predetermined speed, the engine intake manifold suction opens contacts 25 to discontinue starting motor current. Initial closure of thermostatic switch 8 also energizes solenoid 69 and thereby causes energization of solenoid 76 to close switch 44. This connects the main line through wires 40, 41 and 42 to the field of "Selsyn" motor 34 of unit B. The armature of "Selsyn" 34 is connected through switch 48 to one phase of generator 33 of unit B, and to the corresponding phase of generator 92 of unit A as through the ground connections 58 and 47. Hence the Selsyn 34 will partially rotate in either direction depending upon whether the unit B is leading or lagging unit A. Such rotation of "Selsyn" 34 will adjust the engine speed of unit B until it is running at approximately synchronous speed. When synchronous or approximate synchronous speed is accomplished then very little if any current will flow through relay 56 with the result that compression spring 61 will close contact 62 and thereby energize solenoid 6 to close switch 5 and connect generator of unit B to the main line.

*Electrically controlled timing.* — In order to maintain a given frequency in accordance with a predetermined standard, I utilize the "Selsyn" motor 34 by disconnecting it from the synchronizing system after the engine is brought up to synchronous speed and thereupon connecting one winding of the "Selsyn" motor to an external source of current having a standard frequency and connecting the other winding to the generated current. However, in connecting the "Selsyn" motor to the generated current I reverse the phase relation of the "Selsyn" motor from its previous relation. Thereupon the "Selsyn" motor is operative to adjust the governor 27 in accordance with variations in frequency of the generated current from the frequency standard. To reverse the "Selsyn" windings when switch 43 is opened, switch 84 is closed thereby connecting wires 40, 41 and 42 through wires 97, 98 and 99 to the main wires of generator 33. It will be noted, however, that while line 40 is now connected to main line 1, yet wire 41 which was previously connected to main wire 2 is now connected through wire 98 to main line 3. Also wire 42 which was previously connected to main line 3 is now connected through wire 99 to main line 2. Hence current is supplied from the main lines 1, 2 and 3 through wires 97, 98 and 99 and wires 40, 41 and 42 to one field of the "Selsyn" motor. Also when switch 46 was opened, a switch 88 was closed thereby connecting the other field of the "Selsyn" motor 34 through wires 100 and 101 to any suitable external source of current 102. This source may be connected to wires 100 and 101 by a manually operable switch 103.

The "Selsyn" motor 34 will respond to any differences in the generated and standard frequencies and thereby adjust the speed of engine 20. Also, it is seen that a similar "Selsyn" motor 105 and speed governor 106 may be provided for generating unit A. This "Selsyn" motor will be connected through switches 107 and 108 to the main lines and to the comparison or standard source 102. As described, the generating unit A comprises a continuously available source of power while the generating unit B is automatically brought on to the line in accordance with the load demand. However, this relationship may be reversed merely by applying to unit A a duplicate of the control circuits heretofore described for generating unit B.

From the foregoing disclosure it is seen that I have provided a relatively simple and yet very positive and effective synchronizing system, positively cooperating with the engines and the generated current thereof and in addition have provided a very effective arrangement whereby the synchronizing apparatus may be readily converted so as to have controlled timing.

It will of course be understood that various changes in details of construction and arrangement of parts may be made by those skilled in the art without departing from the spirit of the invention as set forth in the appended claims.

I claim:

1. In combination, a plurality of multi-phase alternating current generating units certain of which are normally connected to the main load line and the remainder of which are adapted to be connected to the line to supply additional incoming power as the load demand requires, internal combustion engines for respectively driving said units, each engine having a speed governor for controlling the speed of the engine when operating as an incoming unit, means for controlling the governor of the incoming unit automatically in accordance with whether the generated current thereof is leading or lagging the main line current whereby the engine speed can be adjusted to bring the incoming unit to substantially synchronous speed, and means responsive to an interchange of current between one phase of the incoming generator and a similar phase of the main line for connecting the incoming unit to the line substantially upon occurrence of synchronous operation of the incoming unit, said means for controlling the governor of the incoming unit including a Selsyn motor having field and armature windings, one of which is connected to the main line and the other of which is connected to the generator of the incoming unit, whereby the Selsyn motor rotates in either of opposite directions in accordance with whether the alternating current of the incoming unit is leading or lagging the main line current thereby to adjust the governor to bring the incoming engine speed into synchronism.

2. In combination, a plurality of multi-phase alternating current generating units certain of which are normally connected to the main load line and the remainder of which are adapted to be connected to the line to supply additional incoming power as the load demand requires, internal combustion engines for respectively driving said units, each engine having a speed governor for controlling the speed of the engine when operating as an incoming unit, means for controlling the governor of the incoming unit automatically in accordance with whether the generated current thereof is leading or lagging the main line current whereby the engine speed can be adjusted to bring the incoming unit to substantially synchronous speed, and means responsive to an interchange of current between one phase of the incoming generator and a similar phase of the main line for connecting the incoming unit to the line substantially upon occurrence of synchronous operation of the incoming unit, said means which is responsive to an interchange of current for connecting the incoming unit including a relay having its solenoid connected to one phase of the main line and to another corresponding phase of the incoming generator whereby said solenoid has its maximum energization when the current in the incoming unit is out of its maximum phase with the line current and has progressively reduced energization as the incoming unit approaches synchronous speed.

3. In combination, a plurality of multi-phase alternating current generating units certain of which are normally connected to the main load line and the remainder of which are adapted to be connected to the line to supply additional incoming power as the load demand requires, internal combustion engines for respectively driving said units, each engine having a speed governor for controlling the speed of the engine when operating as an incoming unit, means for controlling the governor of the incoming unit automatically in accordance with whether the generated current thereof is leading or lagging the main line current whereby the engine speed can be adjusted to bring the incoming unit to substantially synchronous speed, means responsive to an interchange of current between one phase of the incoming generator and a similar phase of the main line for connecting the incoming unit to the line substantially upon occurrence of synchronous operation of the incoming unit, said means which is responsive to an interchange of current for connecting the incoming unit including a relay having its solenoid connected to one phase of the main line and to another corresponding phase of the incoming generator whereby said solenoid has its maximum energization when the current in the incoming unit is out of its maximum phase with the line current, and means for closing a switch of said relay substantially upon occurrence of synchronous operation, and a circuit controlled by said relay switch for connecting the incoming generator to the main line.

4. In combination, a plurality of multi-phase alternating current generating units certain of which are normally connected to the main load line and the remainder of which are adapted to be connected to the line to supply additional incoming power as the load demand requires, internal combustion engines for respectively driving said units, each engine having a speed governor for controlling the speed of the engine when operating as an incoming unit, means for controlling the governor of the incoming unit automatically in accordance with whether the generated current thereof is leading or lagging the main line current whereby the engine speed can be adjusted to bring the incoming unit to substantially synchronous speed, means responsive to an interchange of current between one phase of the incoming generator and a similar phase of the main line for connecting the incoming unit to the line substantially upon occurrence of synchronous operation of the incoming unit, said means which is responsive to an interchange of current for connecting the incoming unit including a relay having its solenoid connected to one phase of the main line and to another corresponding phase of the incoming generator whereby said solenoid has its maximum energization when the current in the incoming unit is out of its maximum phase with the line current, and means for retarding closure of a switch of said relay during fluctuations of current in the relay solenoid thereby to prevent the incoming generating unit being connected to the line in the event that it does not have a sufficiently stable period of synchronous operation.

5. In combination, a plurality of multi-phase alternating current generating units certain of which are normally connected to the main load line and the remainder of which are adapted to be connected to the line to supply additional incoming power as the load demand requires, internal combustion engines for respectively driving said units, each engine having a speed governor for controlling the speed of the engine when operating as an incoming unit, means for controlling the governor of the incoming unit automatically in accordance with whether the generated current thereof is leading or lagging the main line current whereby the engine speed can be adjusted to bring the incoming unit to substantially synchronous speed, means responsive to an interchange of current between one phase of the incoming generator and a similar phase of the main line for connecting the incoming unit to the line substantially upon occurrence of synchronous operation of the incoming unit, said means for controlling the governor of the incoming unit including a Selsyn motor having field and armature windings, one of which is connected to the main line and the other of which is connected to the generator of the incoming unit, whereby the Selsyn motor rotates in either of opposite directions in accordance with whether the alternating current of the incoming unit is leading or lagging the main line current thereby to adjust the governor to bring the incoming engine speed into synchronism, and means for establishing said electrical connections for said Selsyn motor automatically upon occurrence of predetermined conditions affecting operation of the incoming unit.

6. In combination, a plurality of multi-phase alternating current generating units certain of which are normally connected to the main load line and the remainder of which are adapted to be connected to the line to supply additional incoming power as the load demand requires, internal combustion engines for respectively driving said units, each engine having a speed governor for controlling the speed of the engine when operating as an incoming unit, means for controlling the goveror of the incoming unit automatically in accordance with whether the generated current thereof is leading or lagging the main line current whereby the engine speed can be adjusted to bring the incoming unit to substantially synchronous speed, means responsive to an interchange of current between one phase of the incoming generator and a similar phase of the main line for connecting the incoming unit to the line substantially upon occurrence of synchronous operation of the incoming unit, said means for controlling the governor of the incoming unit including a Selsyn motor having field and armature windings, one of which is connected to the main line and the other of which is connected to the generator of the incoming unit, whereby the Selsyn motor rotates in either of opposite directions in accordance with whether the alternating current of the incoming unit is leading or lagging the main line current thereby to adjust the governor to bring the incoming engine speed into synchronism, and means for disconnecting said Selsyn electrical means automatically when the incoming unit is connected to the main line.

7. In combination, a plurality of multi-phase alternating current generating units certain of which are normally connected to the main load line and the remainder of which are adapted to be connected to the line to supply additional incoming power as the load demand requires, internal combustion engines for respectively driving said units, each engine having a speed governor for controlling the speed of the engine when operating as an incoming unit, means for controlling the governor of the incoming unit automatically in accordance with whether the generated current thereof is leading or lagging the main line current whereby the engine speed can be adjusted to bring the incoming unit to substantially synchronous speed, means responsive to an interchange of current between one phase of the incoming generator and a similar phase of the main line for connecting the incoming unit to the line substantially upon occurrence of synchronous operation of the incoming unit, said means for controlling the governor of the incoming unit including a Selsyn motor having field and armature windings, one of which is connected to the main line and the other of which is connected to the generator of the incoming unit, whereby the Selsyn motor rotates in either of opposite directions in accordance with whether the alternating current of the incoming unit is leading or lagging the main line current thereby to adjust the governor to bring the incoming engine speed into synchronism, a standard source of alternating current, and means whereby upon connection of the incoming unit to the main line, one of the Selsyn windings is automatically disconnected from its synchronizing condition and is thereupon connected to said standard source of current so as to maintain a predetermined timed operation of the generating units.

8. In combination, a plurality of alternating current generating units driven by internal combustion engines each of which is provided with a governor for controlling the speed thereof, each governor having a Selsyn motor provided with field and armature windings, means for connecting one winding of one Selsyn motor to the corresponding winding of the other Selsyn motor, a standard source of alternating current connected to said commonly connected Selsyn windings, and means for connecting the other windings of each Selsyn motor to the generated current.

CHESTER F. STRONG.